(12) United States Patent
Lee et al.

(10) Patent No.: US 8,811,159 B2
(45) Date of Patent: Aug. 19, 2014

(54) METHOD AND APPARATUS OF TRANSMITTING AND RECEIVING CONFIGURATION INFORMATION OF A PLURALITY OF CELLS IN A WIRELESS SYSTEM

(75) Inventors: Young Dae Lee, Anyang-si (KR); Sung Hoon Jung, Anyang-si (KR); Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 28 days.

(21) Appl. No.: 13/522,846

(22) PCT Filed: Feb. 8, 2011

(86) PCT No.: PCT/KR2011/000814
§ 371 (c)(1),
(2), (4) Date: Jul. 18, 2012

(87) PCT Pub. No.: WO2011/099745
PCT Pub. Date: Aug. 18, 2011

(65) Prior Publication Data
US 2012/0314566 A1   Dec. 13, 2012

Related U.S. Application Data

(60) Provisional application No. 61/302,927, filed on Feb. 9, 2010.

(30) Foreign Application Priority Data

Jan. 12, 2011   (KR) .................. 10-2011-0002944

(51) Int. Cl.
*G01R 31/08*   (2006.01)

(52) U.S. Cl.
USPC ........................................................ 370/225

(58) Field of Classification Search
CPC ... H04W 8/00; H04W 36/00; H04W 36/0055; H04W 36/0005; H04W 36/08; H04W 36/34; H04W 36/16; H04W 48/00
USPC .............. 370/310, 310.2, 328, 216, 338, 331, 370/351, 389, 225, 227, 230, 235, 254
See application file for complete search history.

(56) References Cited

U.S. PATENT DOCUMENTS

| | | | |
|---|---|---|---|
| 2007/0191010 A1 | 8/2007 | Kim et al. | |
| 2010/0067412 A1* | 3/2010 | Kitazoe et al. | 370/294 |
| 2010/0074222 A1* | 3/2010 | Wu | 370/331 |
| 2010/0111039 A1* | 5/2010 | Kim et al. | 370/331 |
| 2011/0080825 A1* | 4/2011 | Dimou et al. | 370/216 |

FOREIGN PATENT DOCUMENTS

| | | |
|---|---|---|
| EP | 1903821 A2 | 3/2008 |
| WO | 2009-020362 A2 | 2/2009 |

OTHER PUBLICATIONS

International Search report issued in corresponding International Application No. PCT/KR2011/000814 dated Sep. 22, 2011.

* cited by examiner

*Primary Examiner* — Anh Ngoc Nguyen
(74) *Attorney, Agent, or Firm* — Morgan, Lewis & Bockius LLP

(57) ABSTRACT

A method and apparatus for transmitting and receiving configuration information of a plurality of cells in a wireless communication system are disclosed. A method for receiving configuration information of a plurality of cells by a terminal in a wireless communication system based on a carrier aggregation includes detecting a radio connection failure, transmitting a radio connection reestablishment request message to a cell from among a first plurality of aggregated cells, and receiving a radio connection reestablishment message including configuration information of a second plurality of aggregated cells from the cell from among the first plurality of aggregated cells.

20 Claims, 11 Drawing Sheets

METHOD AND APPARATUS OF TRANSMITTING AND RECEIVING CONFIGURATION INFORMATION OF A PLURALITY OF CELLS IN A WIRELESS SYSTEM

This is a U.S. National Phase Entry of PCT Application No. PCT/KR2011/000814, filed Feb. 8, 2011, and claims the benefit of Korean Patent Application No. 10-2011-0002944 filed Jan. 12, 2011 and claims the benefit of U.S. Provisional Application No. 61/302,927 filed Feb. 9, 2010.

TECHNICAL FIELD

The present invention relates to a wireless communication system, and more particularly to a method and apparatus for transmitting and receiving configuration information of a plurality of cells in a wireless communication system.

BACKGROUND ART

An Evolved Universal Terrestrial Radio Access Network (E-UTRAN) system will hereinafter be described with reference to FIG. 1.

FIG. 1 is a conceptual diagram illustrating an E-UTRAN structure. The E-UTRAN has evolved from a legacy UTRAN, and basic standardization thereof is now being conducted by the 3rd Generation Partnership Project (3GPP). The E-UMTS system may also be called a Long Term Evolution (LTE) system.

The E-UTRAN includes one or more "eNode B(s)" or "eNB(s)". The eNBs are connected through an X2 interface. Each eNB is connected to a User Equipment (UE) through a radio interface and is connected to an Evolved Packet Core (EPC) through an S1 interface.

The EPC may include a Mobility Management Entity (MME), a Serving-Gateway (S-GW), and a Packet Data Network-Gateway (PDN-GW). The MME may include UE access information or UE capability information, and this information is generally adapted to manage UE mobility. The S-GW is a gateway in which the E-UTRAN is located at an end point, and the PDN-GW is a gateway in which a Packet Data Network (PDN) is located at an end point.

Radio interface protocol layers between the UE and the network are classified into a first layer (L1), a second layer (L2), and a third layer (L3) on the basis of three lower layers of an Open System Interconnection (OSI) reference model well known to a communication-system field. The first layer (L1) provides an information transfer service using a physical channel. A radio resource control (RRC) layer located at the third layer (L3) controls radio resources between the UE and the network. For this operation, the RRC layer exchanges RRC messages between the UE and the network.

FIG. 2 illustrates a control plane of a radio interface protocol between a User Equipment (UE) and a UMTS Terrestrial Radio Access Network (UTRAN) according to the 3GPP wireless access network standard. FIG. 3 illustrates a user plane (U-Plane) of a radio interface protocol between a User Equipment (UE) and an E-UTRAN according to the 3GPP wireless access network standard.

A radio interface protocol includes a physical layer, a data link layer, and a network layer horizontally. Vertically, the radio interface protocol includes a user plane for transmitting data information and a control plane for transmitting a control signal (i.e., a signaling message). The protocol layers shown in FIG. 2 may be classified into a first layer (L1), a second layer (L2), and a third layer (L3) on the basis of three lower layers of an Open System Interconnection (OSI) reference model well known to the communication system. The UE and the E-UTRAN include a pair of such radio protocol layers, and are used to transmit data via an air interface.

A physical layer serving as the first layer (L1) transmits an information transfer service to an upper layer over a physical channel. The physical layer is connected to a Medium Access Control (MAC) layer serving as an upper layer over a transport channel. Data is transferred from the MAC layer to the physical layer or the transport channel, or is also transferred from the physical layer to the MAC layer. And, data is transferred between different physical layers over the physical channel. In other words, data is transferred from a transmitting physical layer to a receiving physical layer over the physical channel. The above-mentioned physical channel is modulated according to an orthogonal frequency division multiplexing (OFDM) scheme, so that the physical channel uses time and frequency information as radio resources.

The MAC layer of the second layer (L2) transmits services to a Radio Link Control (RLC) layer serving as an upper layer over a logical channel. The RLC layer of the second layer (L2) supports transmission of reliable data.

The RLC layer function may be implemented as a functional block contained in the MAC layer. In this case, the RLC layer may not be present. A Packet Data Convergence Protocol (PDCP) layer of the second layer (L2) performs a header compression function to reduce the size of an IP packet header having relatively large and unnecessary control information in order to efficiently transmit IP packets such as IPv4 or IPv6 packets in a radio interval with a narrow bandwidth.

The radio resource control (RRC) layer located at the lowest of the third layer (L3) is defined on a control plane only. In association with configuration, re-configuration, and release of radio bearers (RBs), the RRC layer controls the logical channel, the transport channel, and the physical channels. In this case, the above radio bearer (RB) is provided from the second layer (L2) to perform data communication between the UE and the UTRAN. If an RRC connection is located between the RRC layer of the UE and the RRC layer of the radio network, the UE stays in an RRC connected (RRC_CONNECTED) state. Otherwise, the UE stays in an RRC idle (RRC_IDEL) state.

There are a plurality of downlink transport channels for transmitting data from the network to the UE, for example, a broadcast channel (BCH) for transmitting system information, a paging channel (PCH) for transmitting paging messages, and a downlink shared channel (DL-SCH) for transmitting user traffic or control messages. Traffic or control messages of a downlink multicast or a broadcast service (Multimedia Broadcast/Multicast Service: MBMS) may be transmitted over a downlink multicast channel (MCH). In the meantime, there are a plurality of uplink transport channels for transmitting data from the UE to the network, for example, a random access channel (RACH) for transmitting initial control messages, and an uplink shared channel for transmitting user traffic or control messages.

A plurality of logical channels are located above the transport channel, and are mapped to the transport channel. For example, the logical channels may be a broadcast channel (BCCH), a paging control channel (PCCH), a common control channel (CCCH), a multicast control channel (MCCH), and a multicast traffic channel (MTCH).

A physical channel includes a plurality of subframes on the time axis and a plurality of subcarriers on the frequency axis. Here, one subframe includes a plurality of symbols on the time axis. One subframe includes a plurality of resource blocks and one resource block includes a plurality of symbols and a plurality of subcarriers. Each subframe can use specific subcarriers of a specific symbol (e.g., a first symbol) of the subframe for a Physical Downlink Control Channel (PD-CCH) (i.e., an L1/L2 control channel). Each subframe has 0.5 ms. A Transmission Time Interval (TTI), which is time unit during which data is transmitted, is 1 ms.

In order to disclose detailed operations of the RRC state and the RRC connection method, a UE's RRC state and its RRC connection method will hereinafter be described in detail. The RRC state indicates whether a UE's RRC layer is logically connected to an E-UTRAN's RRC layer. If it is determined that the UE's RRC layer is logically connected to the E-UTRAN's RRC layer, this state is called a RRC connected (RRC_CONNECTED) state. If the UE's RRC layer is not logically connected to the E-UTRAN's RRC layer, this state is called a RRC idle (RRC_IDLE) state. A UE in the RRC connected (RRC_CONNECTED) state has a RRC connection, such that the E-UTRAN can recognize the presence of the corresponding UE in units of a cell. As a result, the UE can be effectively controlled. Otherwise, a UE in a RRC idle (RRC_IDLE) state cannot be recognized by the E-UTRAN, but is controlled by a core network (CN) in units of a tracking area larger than the cell. In other words, only the presence or absence of the above RRC-connected UE is recognized in units of a large region. If the RRC-connected UE desires to receive a general mobile communication service such as a voice or data service, the UE must enter the RRC connection state. Associated detailed description will hereinafter be described in detail.

If a user initially powers on his or her UE, the UE searches for an appropriate cell, and stays at a RRC_IDLE state in the searched cell. The UE staying at the RRC_IDLE state establishes a RRC connection in association with the E-UTRAN's RRC layer through a RRC connection procedure when it needs to establish the RRC connection, such that it is shifted to the RRC_CONNECTED state. The UE under the RRC_IDLE state must establish the RRC connection due to a variety of reasons. For example, if uplink data transmission is needed due to a user's phone call attempt, or if a paging message is received from the E-UTRAN such that a response message to the paging message must be transmitted, the UE under the RRC_IDLE state needs to connect the RRC connection.

A Non-Access Stratum (NAS) layer located above the RRC layer performs functions such as session management and mobility management.

In order to manage UE mobility, an EPS Mobility Management-REGISTERED (EMM-REGISTERED) state and an EMM-DEREGISTERED state are defined in the NAS layer. The EMM-REGISTERED state and the EMM-DEREGISTERED state are applied to a UE and a Mobility Management Entity (MME). The user equipment (UE) is initially in the EMM-DEREGISTERED status, and carries out an 'Initial Attach' procedure to access a network, such that it is registered in the corresponding network. If this 'Attach' procedure has been successfully carried out, the UE and the MME enter the EMM-REGISTERED state.

In order to manage a signaling connection between the UE and the EPC, an EPS Connection Management (ECM)-IDLE state and an ECM-CONNECTED state are defined. The above-mentioned states are applied to the UE and the MME. The UE in the ECM-IDLE state is in the ECM-CONNECTED state when it establishes an RRC connection with an E-UTRAN. If the MME of the ECM-IDLE state makes an S1 connection with the E-UTRAN, it enters the ECM-CONNECTED state. If the UE is in the ECM-IDLE state, the E-UTRAN has no context information of the UE. Therefore, the UE of the ECM-IDLE state carries out an UE-based mobility procedure (e.g., cell selection or cell reselection) without receiving a command from the network. Otherwise, if the UE is in the ECM-CONNECTED state, UE mobility is managed by the network. If the UE is in the ECM-IDLE state and the UE's location recognized by the network changes to another UE location, the UE performs a Tracking Area Update procedure, such that it informs the network of the UE's location.

System information will hereinafter be described in detail. The system information includes requisite information that must be recognized by the UE that desires to access a base station (BS). Accordingly, the UE must receive all the system information before accessing the BS, and must always include the latest system information. In addition, the system information must be recognized by all UEs contained in one cell, such that the BS periodically transmits the system information.

The system information is classified into a master information block (MIB), a scheduling block (SB), a system information block (SIB), etc. The MIB includes physical configuration information (e.g., a bandwidth) of the corresponding cell. The SB includes transmission information such as a transmission period of each SIB. The SIB is an aggregate (or a set) of mutually-associated system information. For example, a certain SIB includes only information of a neighbor cell, and a certain SIB includes only information of an uplink radio channel used in the UE.

The service provided from the network to the UE may be classified into three types. The UE may differently recognize a cell type according to categories of received services.

There are a variety of service types, i.e., a limited service, a normal service, and an operator service.

The limited service may provide an emergency call and an Earthquake and Tsunami Warning service (ETWS), and may be received from the acceptable cell. The normal service may indicate a public use of a general purpose, and may be received from a suitable cell. The operator service may indicate a service for a communication network enterprise and may be utilized only by the communication network enterprise, and it is impossible for a normal user to use this operator service.

In association with the type of a service provided from a cell, there are a variety of cell types, i.e., an acceptable cell, a suitable cell, a barred cell, and a reserved cell.

The acceptable cell can provide the limited service to the UE. From the viewpoint of a UE, the acceptable cell is not barred and satisfies a cell selection reference.

The suitable cell can provide a normal service to the UE, and can also satisfy additional conditions simultaneously while satisfying the condition of the acceptable cell. A detailed description of the additional conditions is as follows. That is, this cell must belong to a Public Land-Mobile Area (PLMN) capable of accessing a UE, and the prevention of the execution of a tracking area (TA) update procedure of the UE need not be applied to this cell. If it is assumed that the corresponding cell is a Closed Subscriber Group (CSG), it is necessary for the UE acting as a SCG member to access the above-mentioned cell.

The barred cell is a cell that broadcasts information indicating the barred cell through system information. The reserved cell is a cell that broadcasts information indicating the reserved cell through system information.

In order to allow the LTE-advanced (LTE-A) system to further extend a bandwidth as compared to the LTE system, a carrier for use in a legacy LTE system is defined as a component carrier (CC), and a new technology for combining a maximum of 5 CCs into one group is now being intensively researched. Likewise, the technology for combining a plurality of component carriers (CCs) and using the combined CCs is called a carrier aggregation (CA) technology.

In order to maintain a communication link quality between a UE and a cell that provides a service to the UE, the UE continuously performs measurement. In particular, the UE determines whether a communication link quality with a cell that currently provides a service is in a communication unavailable state. If the cell that currently provides a current service is in a communication unavailable state, the UE declares a radio link failure (RLF). If the UE declares the RLF, the UE abandons maintenance of a communication state with the cell, and selects a cell through a sell selection procedure such that it attempts to reconfigure RRC connection with the selected cell.

When the UE starts the RRC connection reconfiguration procedure, the UE has to temporarily suspend the use of all radio bearers other than a 'Signaling Radio Bearer (SRB) 0'. The SRB is a radio bearer that is used only to transmit an RRC message and a NAS message, and is classified into SRB0, SRB1 and SRB2. SRB0 is used for an RRC message that uses a Common Control Channel (CCCH) logical channel.

If the UE has successfully established the RRC connection reconfiguration, the use of an SRB1, the use of which is temporarily prevented, is resumed. After that, the RRC connection reconfiguration procedure is carried out so that Data Radio Bearers (DRBs) are reconfigured and data transmission/reception is resumed through DRBs.

According to the conventional art, if the carrier aggregation (CA) is used, configuration information of the carrier aggregation (CA) is contained only in the RRC connection reconfiguration message, such that it is impossible to use a plurality of component carriers (CCs) and it is possible to transmit and receive data through only one component carrier (CC). As a result, according to the conventional art, if a radio link failure (RLF) occurs in a HE which transmits and receives data using a plurality of component carriers (CCs), a predetermined time delay unavoidably occurs until data transmission/reception is resumed through a plurality of component carriers (CCs).

DISCLOSURE OF INVENTION

Technical Problem

Accordingly, the present invention is directed to a method and apparatus for transmitting and receiving configuration information of a plurality of cells in a wireless system that substantially obviate one or more problems due to limitations and disadvantages of the related art.

In accordance with the conventional art, the carrier aggregation (CA) configuration information is contained only in the RRC connection reconfiguration message, such that the conventional art has a disadvantage in that a time delay occurs until data transmission/reception is resumed through a plurality of CCs.

An object of the present invention devised to solve the problem lies on a method for transmitting and receiving configuration information of a plurality of cells capable of reducing a time delay encountered until data transmission/reception starts operation through a plurality of component carriers (CCs).

It will be appreciated by persons skilled in the art that the objects that can be achieved with the present invention are not limited to what has been particularly described hereinabove and the above and other objects that the present invention can achieve will be more clearly understood from the following detailed description taken in conjunction with the accompanying drawings.

Solution to Problem

The object of the present invention can be achieved by providing a method for receiving configuration information of a plurality of cells by a terminal in a wireless communication system, the method including: detecting a radio connection failure; transmitting a radio connection reestablishment request message to a cell from among a plurality first of aggregated cells; and receiving a radio connection reestablishment message including configuration information of a second plurality of aggregated cells from the cell from among the first plurality of aggregated cells.

The radio connection reestablishment request message may be a Radio Resource Control (RRC) connection reestablishment request message, and the radio connection reestablishment message may be a RRC connection reestablishment message.

The RRC connection reestablishment request message may include an identifier (ID) of a special cell from among the first plurality of aggregated cells.

The special cell may provide at least one of security information and Non-Access-Stratum (NAS) mobility information to the terminal.

The RRC connection reestablishment message may further include system information of the second plurality of aggregated cells.

The RRC connection reestablishment message may further include measurement information for the second plurality of aggregated cells.

The method may further include transmitting a RRC connection reestablishment completion message to the cell from among the first plurality of aggregated cells.

The RRC connection reestablishment completion message may include a measurement report for the second plurality of aggregated cells.

The method may further include communicating with at least one of the second plurality of aggregated cells on the basis of the configuration information of the second plurality of aggregated cells.

The radio connection failure may be at least one of a radio link failure (RLF) or a handover (HO) failure.

In another aspect of the present invention, provided herein is a method for transmitting configuration information of a plurality of cells by a base station (BS) in a wireless communication system, the method including receiving a radio connection reestablishment request message through a cell from among a first plurality of aggregated cells from a terminal having detected a radio connection failure, and transmitting a radio connection reestablishment message including configuration information of a second plurality of aggregated cells through the cell from among the first plurality of aggregated cells to the terminal.

Advantageous Effects of Invention

Exemplary embodiments of the present invention have the following effects. In accordance with the embodiments of the present invention, a base station (BS) transmits configuration information of several cells to a UE through an RRC connection reconfiguration message, resulting in a reduction in a time delay caused by the radio link failure (RLF) recovery procedure.

It will be appreciated by persons skilled in the art that that the effects that can be achieved through the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a UMTS system serving as a mobile communication system, but the present invention is not limited thereto and the remaining parts of the present invention other than unique characteristics of the UMTS system are applicable to other mobile communication system.

In some cases, in order to prevent ambiguity of the concepts of the present invention, conventional devices or apparatuses well known to those skilled in the art will be omitted and be denoted in block diagram form on the basis of the important functions of the present invention. Wherever possible, the same reference numbers will be used throughout the drawings to refer to the same or like parts.

In the following description, a terminal may refer to a mobile or fixed user equipment (UE), for example, a user equipment (UE), a mobile station (MS) and the like. Also, the base station (BS) may refer to an arbitrary node of a network end which communicates with the above terminal, and may include a Node B (Node-B), an eNode B (eNode-B), and an access point (AP) and the like.

Figure 1:
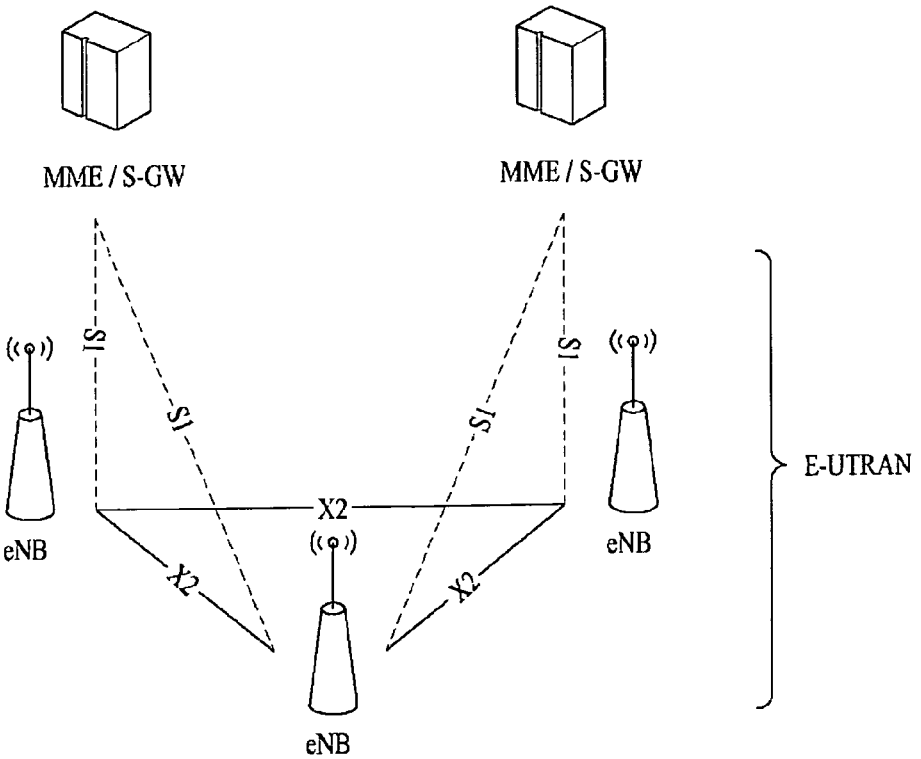
FIG. 1 is a conceptual diagram illustrating an Evolved Universal Terrestrial Radio Access Network (E-UTRAN) structure.
Figure 2:
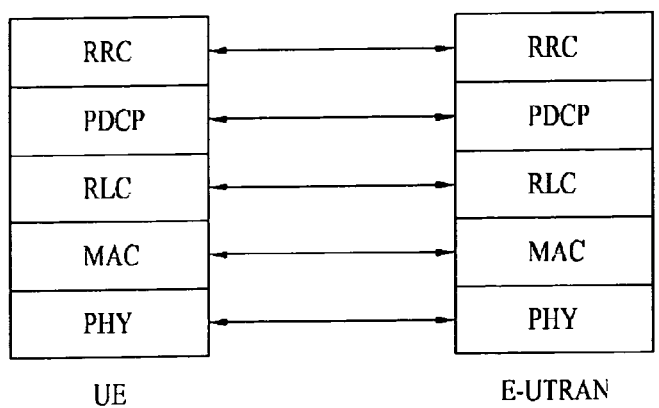
FIG. 2 illustrates a control plane of a radio interface protocol between a User Equipment (UE) and a UMTS Terrestrial Radio Access Network (UTRAN) according to the 3GPP wireless access network standard.
Figure 3:
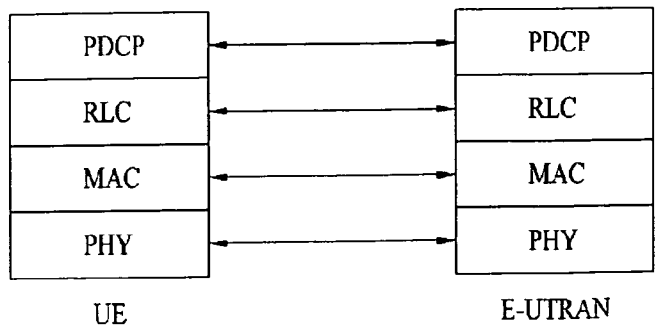
FIG. 3 illustrates a user plane (U-Plane) of a radio interface protocol between a User Equipment (UE) and an E-UTRAN according to the 3GPP wireless access network standard.
Figure 4:
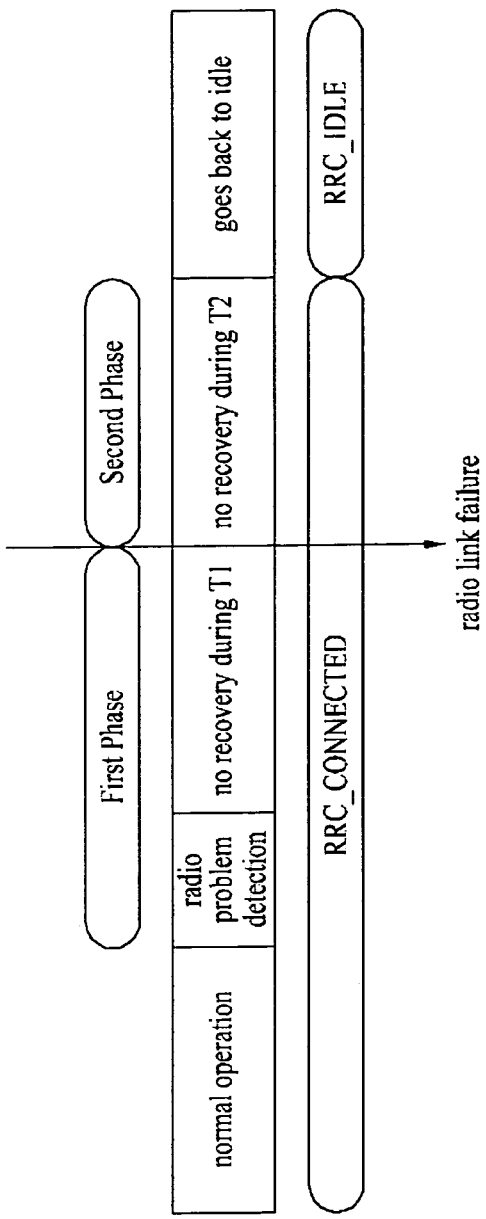
FIG. 4 is a conceptual diagram illustrating a radio link failure (RLF).

A radio link failure (RLF) will hereinafter be described with reference to FIG. 4. FIG. 4 shows a radio link failure (RLF). A user equipment (UE) or a mobile station (MS) continuously performs measurement to maintain a communication link quality. Specifically, the UE (or MS) performs measurement such that it determines whether a communication link quality with a cell that provides a current service is in a communication unavailable state. If the UE (or MS) determines that the cell that currently provides the service has a poor quality causing a communication unavailable state, a radio link failure (RLF) is declared. If the UE (or MS) has declared the RLF, the UE (or MS) abandons maintenance of a communication state with this cell, selects a cell through a cell selection procedure, and finally attempts to establish RRC connection reconfiguration.

As shown in FIG. 4, the operation associated with the radio link failure (RLF) can be classified into two steps.

In the first step, the UE (or MS) determines whether an unexpected problem occurs in a current communication link. If the problem has occurred in the current communication link, the UE (or MS) declares a radio link problem and waits for the recovery of this communication link during a predetermined time T1. If the corresponding link recovery is achieved during the predetermined time T1, the UE (or MS) continuously performs the normal operation. If the radio link problem is not recovered during the predetermined time T1 in the first step, the UE (or MS) declares the radio link failure (RLF) and then enters a second step. In the second step, the UE (or MS) performs an RRC connection reestablishment procedure (also called an RRC connection reconfiguration procedure) such that it can recover from a radio link failure (RLF).

In the RRC connection reestablishment procedure, the UE (or MS) re-establishes the RRC connection under the RRC_CONNECTED state. Because the UE (or MS) stays in the RRC_CONNECTED state (i.e., because the UE (or MS) does not enter the RRC_IDLE state), the UE (or MS) does not initialize all of UE radio configuration (e.g., radio bearer (RB) configuration). Instead of not initializing all the UE radio configuration, when the UE (or MS) starts the RRC connection reestablishment procedure, the use of all radio bearers (RBs) other than 'SRB0' is temporarily suspended. If the RRC connection reestablishment (RRC connection reconfiguration) has been successfully performed, the use of temporarily-suspended radio bearers (RBs) is resumed.

The UE (or MS) operation for use in the RRC connection reconfiguration procedure will hereinafter be described. First, the UE (or MS) performs cell selection so as to select a single cell. In order to receive basic parameters for cell connection from the selected cell, the UE receives system information. In addition, the UE attempts to establish RRC connection through a random access procedure.

Figure 5:
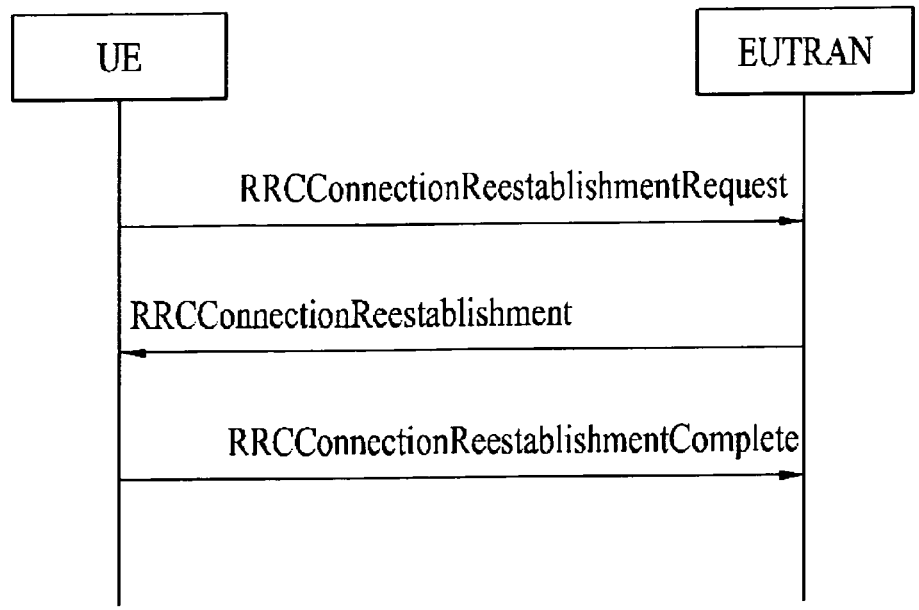
FIG. 5 is a conceptual diagram illustrating successful RRC connection reconfiguration.
Figure 6:
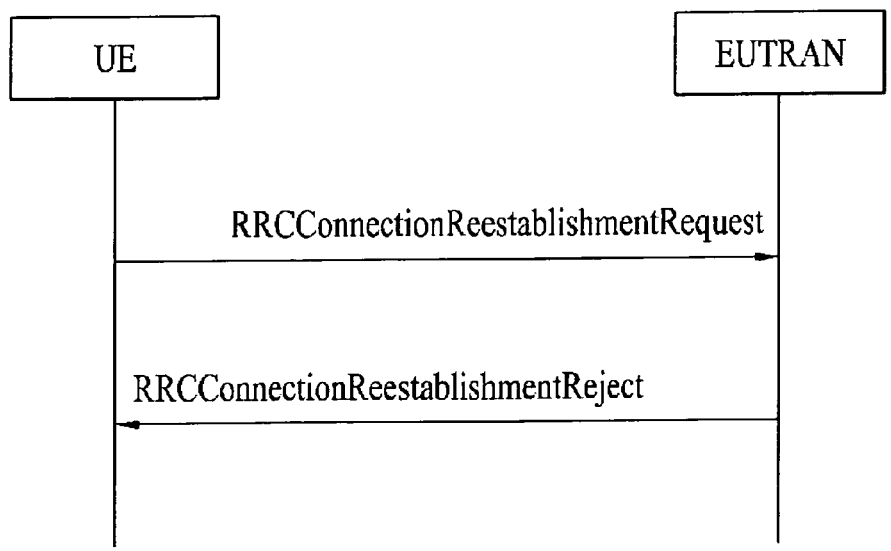
FIG. 6 is a conceptual diagram illustrating a failure in RRC connection reconfiguration.

FIG. 5 is a conceptual diagram illustrating successful RRC connection reconfiguration. FIG. 6 is a conceptual diagram illustrating a failure in RRC connection reconfiguration.

Referring to FIG. 5, the UE transmits an RRC connection reestablishment request message to a network. If the cell selected by the UE through cell selection includes context information of the UE (i.e., if the above-mentioned cell is a prepared cell), the corresponding cell can accept the RRC connection reestablishment request of the UE and can successfully carry out the RRC connection reestablishment procedure.

However, as shown in FIG. 6, if the cell selected by the UE is not the prepared cell, because the corresponding cell does not include the UE context, it is impossible to accept the RRC connection reestablishment request of the UE and the RRC connection reestablishment procedure is failed.

The measurement will hereinafter be described.

It is necessary for the mobile communication system to support the UE mobility. In order to support the UE mobility, the UE continuously measures not only the quality of a serving cell that currently provides a current service but also the quality of a neighbor cell of the serving cell. The UE transmits the measurement result to the network at an appropriate time, and the network transmits a handover (HO) command and the like to the UE on the basis of the measurement resultant value reported by the UE and provides optimum mobility to the UE.

In order to support the UE mobility as well as to provide information that is helpful to network management of the enterpriser, the UE may perform a measurement procedure having a specific purpose established in the network or may report the measurement result to the network. For example, the UE receives broadcast information of a specific cell decided by the network, recognizes identifier (ID) information of a specific cell, position identification information and information of other cells, and reports the recognized information to the serving cell. For example, a global cell identity (ID) may be used as exemplary ID information, and a tracking area code may be used as exemplary position identification information. Other cell information may indicate the presence or absence of a member when the corresponding cell is a Closed Subscriber Group (CSG) cell.

Otherwise, in the case where the measurement process has confirmed that a specific region has a poor quality while the UE is in motion, position information of poor-quality cells and the measurement results may be reported to the network as necessary. The network may be optimized on the basis of the measurement result report of UEs that help to manage the network.

Under a mobile communication system management format having a frequency reuse factor of 1, UE mobility can be obtained between different cells that mostly stay in the same frequency. Therefore, in order to well guarantee the UE mobility, the UE needs to search for some cells, each of which uses the same intermediate frequency (IF) as that of the serving cell, and also needs to well measure the quality of each searched neighbor cell and cell information. As described above, the operation for performing measurement of a cell that uses the same intermediate frequency (IF) as that of the serving cell is called an intra-frequency measurement. The UE performs the intra-frequency measurement, and reports the measurement result to the network at an appropriate time, such that it can accomplish the purpose of the corresponding measurement result.

The mobile communication enterpriser may also manage the network using a plurality of frequencies. In order to guarantee the optimum mobility of the UE under the condition that the service of a mobile communication system is provided through a plurality of frequencies, it is necessary for the UE to search for cells located in a frequency different from that of the serving cell, and the UE needs to effectively measure the quality and cell information of the searched neighbor cells. In this way, measurement of a cell that uses an intermediate frequency (IF) different from that of the serving cell is called 'inter-frequency measurement'. The UE performs the inter-frequency measurement and needs to report the measurement result to the network at an appropriate time.

If the UE supports the measurement of a heterogeneous communication network, cell measurement for a heterogeneous communication network may also be carried out according to configuration information of the base station (BS). The measurement of the heterogeneous network may also be called Inter-RAT measurement. Nowadays, from the viewpoint of the current LTE UE, there are a variety of inter RATs, for example, a UMTS Terrestrial Radio Access (UTRA) and a GSM EDGE radio access network (GERAN) according to the 3GPP standard specification, a CDMA 2000 system according to the 3GPP2 standard specification, and the like.

Figure 7:
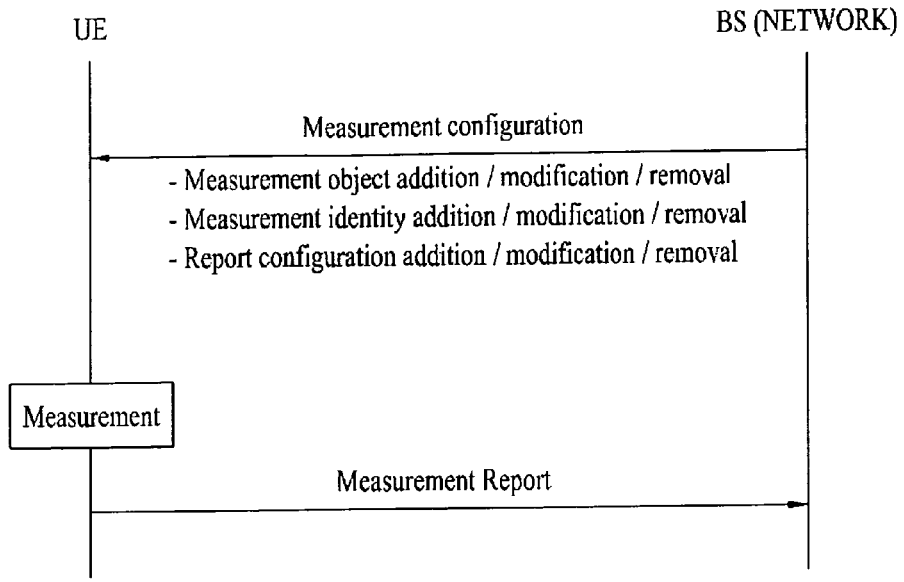
FIG. 7 is a conceptual diagram illustrating a measurement process.

FIG. 7 is a conceptual diagram illustrating a measurement process. As shown in FIG. 7, the UE receives measurement configuration information from the BS (denoted by 'NETWORK'), decides an object to be measured according to the measurement configuration, and reports the measurement report to the BS. Upon receiving a measurement configuration message or a message corresponding to the measurement configuration message, the UE performs measurement in response to the received message. If the measurement result satisfies the measurement result report condition contained in the measurement configuration information, the UE includes the measurement result in a measurement report (MR) message or a message corresponding to the MR message and transmits the resultant message including the measurement result to the base station (BS).

The measurement configuration includes information about measurement objects, information about the reporting configurations, information about the measurement identity, information about quantity configurations, and information about a measurement gap.

The measurement object is indicative of a parameter that decides an object to be measured. From the viewpoint of the UE, the measurement object to be established is any one of an intra-frequency measurement object, an inter-frequency measurement object, and an Inter-RAT measurement object.

The reporting configuration means a parameter that decides not only a reference indicating a specific time at which the UE has to transmit the measurement report message, but also an associated report format.

The measurement identity is a measurement identification parameter that connects a specific measurement object to a specific report configuration, such that it can decide what a report scheme to be applied to a certain object is and when information about the certain object is to be reported. The measurement identity is also contained in the measurement report message, such that it can indicate information about a certain object associated with the measurement result contained in the corresponding message and can also indicate which one of report triggers causes transmission of the measurement report message.

The quantity configuration is a parameter that establishes a measurement unit and a report unit and also establishes a filter value for filtering the measurement resultant value.

During the measurement gap, downlink (DL) transmission or uplink (UL) transmission is not scheduled, and the UE can perform only the measurement function without the need of transmitting data to the serving cell.

For the measurement procedure, the UE includes the list of measurement objects, the list of report configurations and the list of measurement identities. The BS can establish only one measurement object for a single frequency for use in the UE.

A variety of events are defined as a report trigger of the reporting configuration. If the measurement result of the UE satisfies the established event, the UE transmits the measurement report message to the BS. The following report triggers are defined in the LTE system. Event A1 indicates that the quality of a serving cell is higher than a threshold value, Event A2 indicates that the quality of a serving cell is lower than a threshold value, Event A3 indicates that the quality of a neighbor cell is higher than that of a serving cell by an offset value, Event A4 indicates that the quality of a neighbor cell is higher than a threshold value, and Event A5 indicates that the quality of a serving cell is lower than a threshold value '1' and the quality of a neighbor cell is higher than a threshold value '2'. Event B1 indicates that the quality of an Inter-RAT neighbor cell is higher than a threshold value, and Event B2 indicates that the quality of a serving cell is lower than a threshold value '1' and the quality of an inter-RAT neighbor cell is higher than a threshold value '2'.

Figure 8:
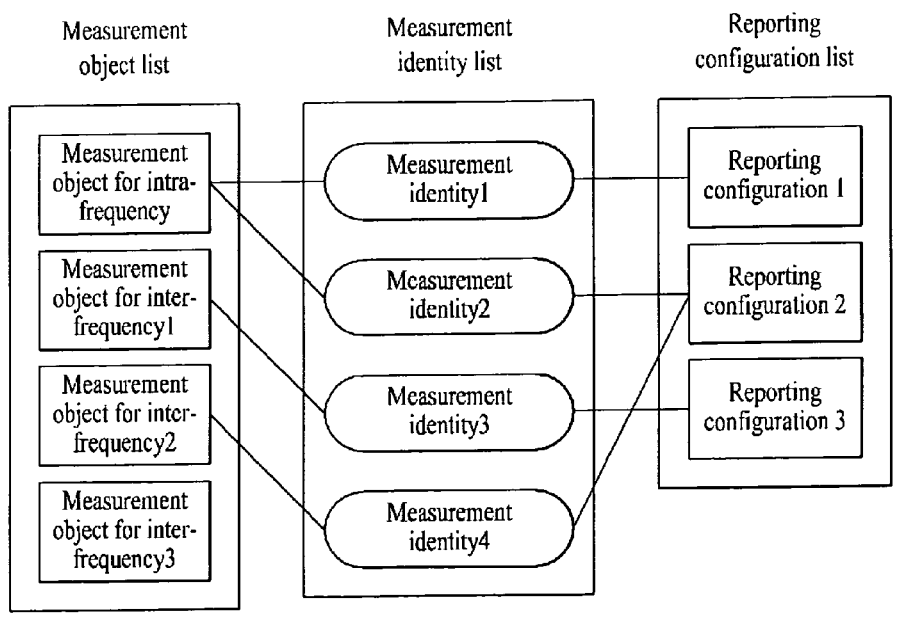
FIG. 8 is a conceptual diagram illustrating an exemplary measurement configuration established in a user equipment (UE).

FIG. 8 is a conceptual diagram illustrating an exemplary measurement configuration established in a user equipment (UE).

In FIG. 8, the measurement identity 1 connects the intra-frequency measurement object to the reporting configuration 1. Therefore, the UE performs the intra-frequency measurement, and the reporting configuration 1 is adapted to decide not only a reference for transmission of the measurement result but also the reporting format.

The measurement identity 2 connects the intra-frequency measurement object to the reporting configuration 2. Therefore, the UE performs the intra-frequency measurement, and the reporting configuration 2 is adapted to decide not only a reference for transmission of the measurement result but also the reporting format. Therefore, if the measurement result of the intra-frequency measurement satisfies any one of a first result report reference contained in the reporting configuration 1 and a second result report reference contained in the reporting configuration 2, the UE transmits the measurement result to the BS.

The measurement identity 3 connects the inter-frequency 1 measurement object to the reporting configuration 3. Therefore, if the measurement result for a cell contained in the inter-frequency 1 satisfies the result report reference contained in the reporting configuration 3, the UE reports the measurement result to the BS.

The measurement identity 4 connects the inter-frequency 2 measurement object to the reporting configuration 2. Therefore, if the measurement result for a cell contained in the inter-frequency 2 satisfies the result report reference contained in the reporting configuration 2, the UE reports the measurement result to the BS.

The BS may command the UE to add, delete, and change the measurement object, the reporting configuration, and the measurement identity.

Figure 9:
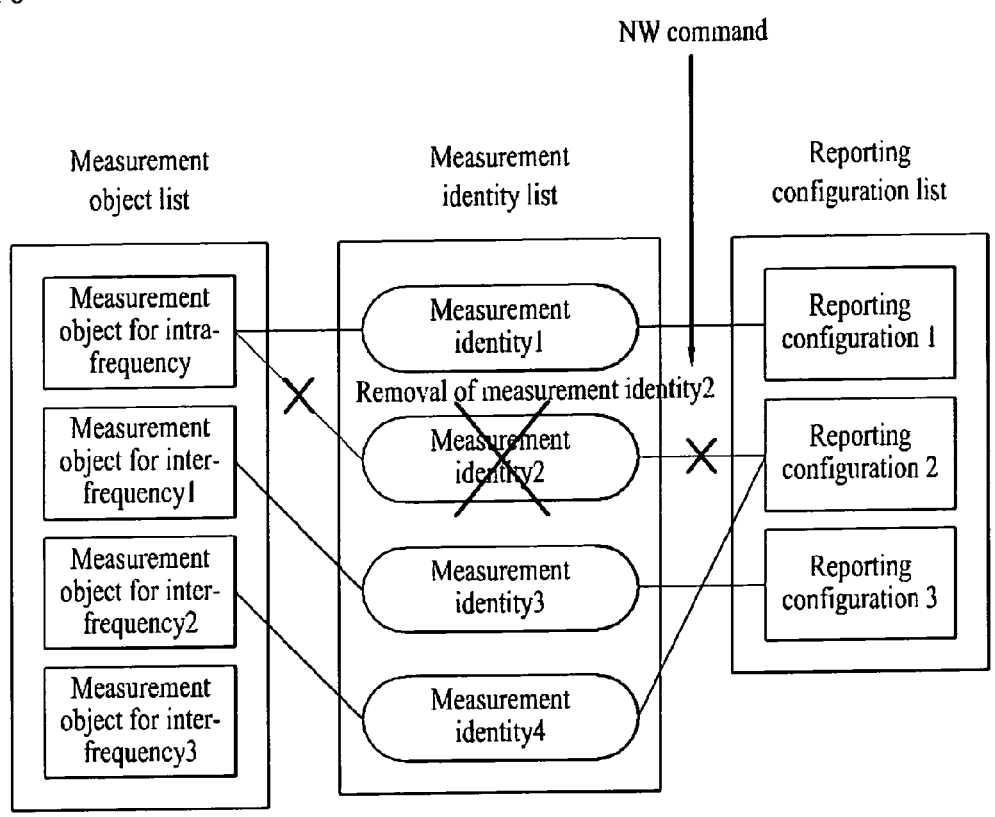
FIG. 9 is a conceptual diagram illustrating an exemplary case in which a base station (BS) commands a UE to delete a measurement identity.
Figure 10:
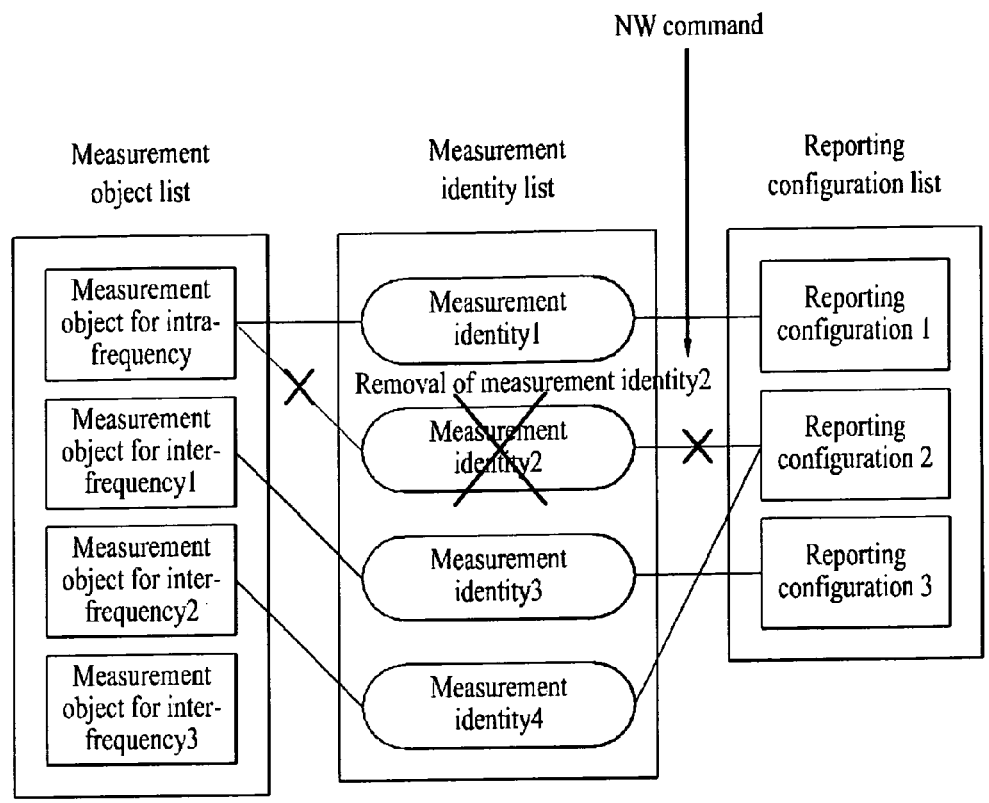
FIG. 10 is a conceptual diagram illustrating an exemplary case in which a base station (BS) commands a UE to delete a measurement object.

FIG. 9 is a conceptual diagram illustrating an exemplary case in which a base station (BS) commands a UE to delete a measurement identity. Referring to FIG. 9, if the BS commands the UE to delete a specific measurement identity, the UE stops the measurement related to the corresponding measurement identity and also stops reporting the measurement result. In this case, the related measurement object and the reporting configuration are not changed, FIG. 10 is a conceptual diagram illustrating an exemplary case in which a base station (BS) commands a UE to delete a measurement object. Referring to FIG. 10, if the BS commands the UE to delete the measurement object, the UE also deletes the related measurement identity, and then the UE stops measuring the corresponding measurement object and also stops reporting the measurement result. However, the related report configuration is not changed.

If the BS commands the UE to delete a specific reporting configuration, the UE deletes the related measurement identity, and then the UE stops measuring the measurement object related to the measurement identity and also stops reporting the measurement result. However, the related report configuration is not changed.

Next, Carrier Aggregation (CA) will be described with reference to the attached drawings.

The LTE-A technology standard is IMT-Advanced candidate technology of the International Telecommunication Union (ITU) and is designed to suit the requirements of the IMT-Advanced technology of the ITU. In the LTE-A, in order to satisfy the requirements of the ITU, extension of a bandwidth of the existing LTE system is being discussed.

Figure 11:
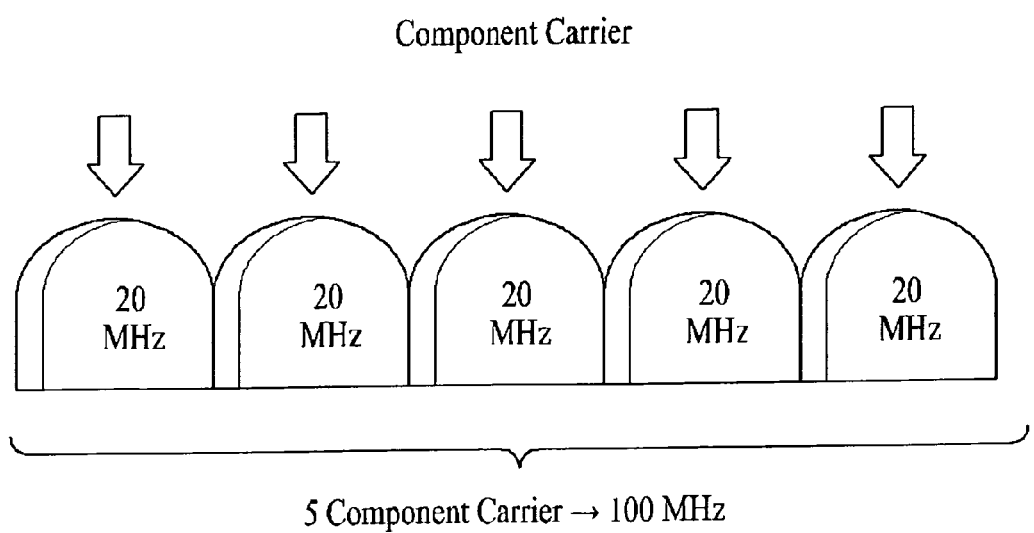
FIG. 11 shows an example of a carrier aggregation (CA).

FIG. 11 shows an example of a carrier aggregation (CA). Referring to FIG. 11,

In the LTE-A system, in order to extend the bandwidth, a carrier of the existing LTE system is defined as a Component Carrier (CC) and a method of aggregating and utilizing a maximum of five CCs is being discussed. Since the CC may have a maximum bandwidth of 20 MHz as in the LTE system, the bandwidth may extend to 100 MHZ as a maximum. Technology of aggregating a plurality of CCs is referred to as carrier aggregation.

In the case where the UE and the BS transmit and receive data via a plurality of CCs using a carrier aggregation (CA), one component carrier is one cell, and one of the plurality of CCs constructed for only one UE is referred to as a primary cell (PCell). The main cell may provide an input parameter for security and may be used for NAS mobility information.

Figure 12:
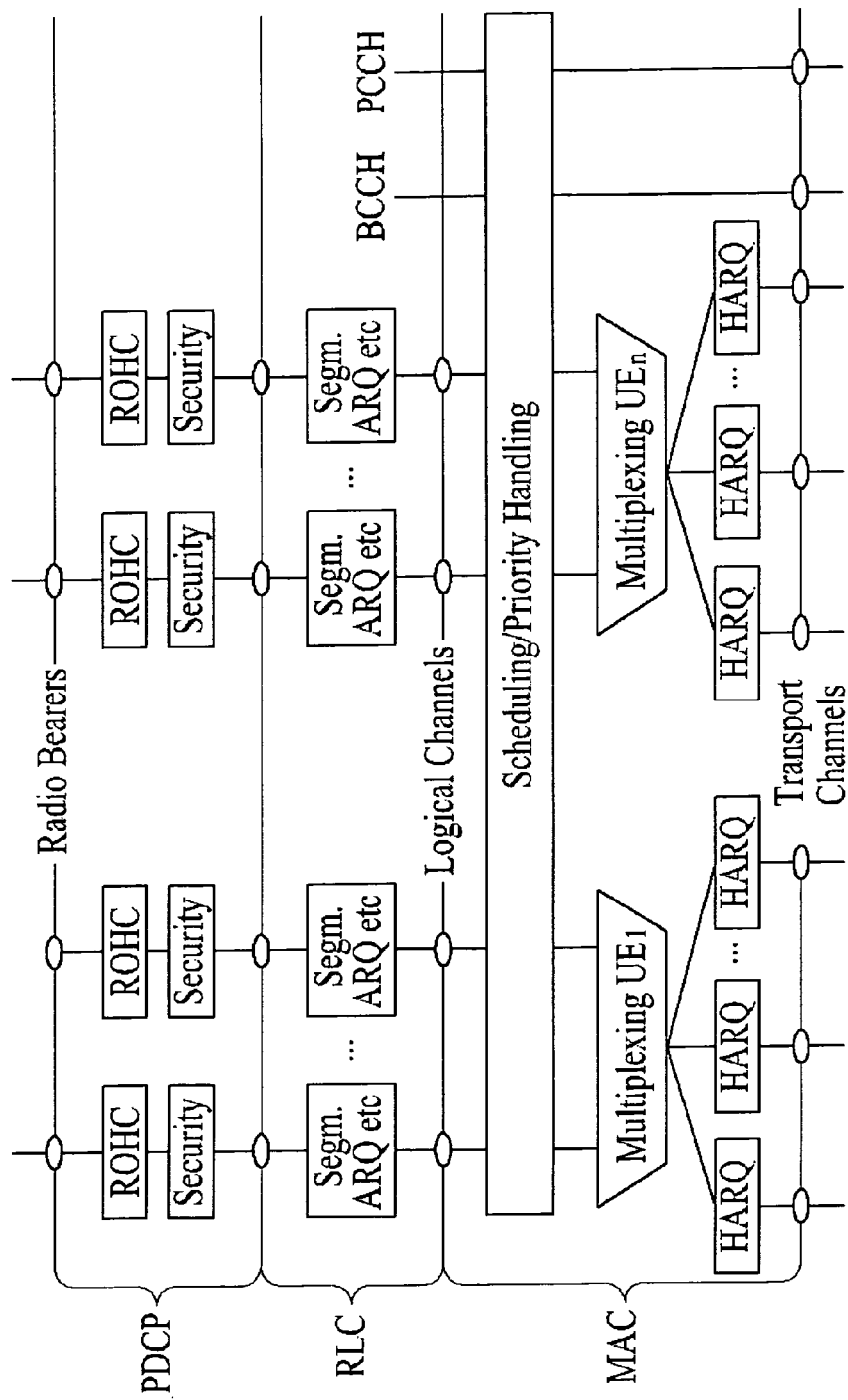
FIG. 12 shows an example of a two-layered structure that considers a carrier aggregation (CA).
Figure 13:
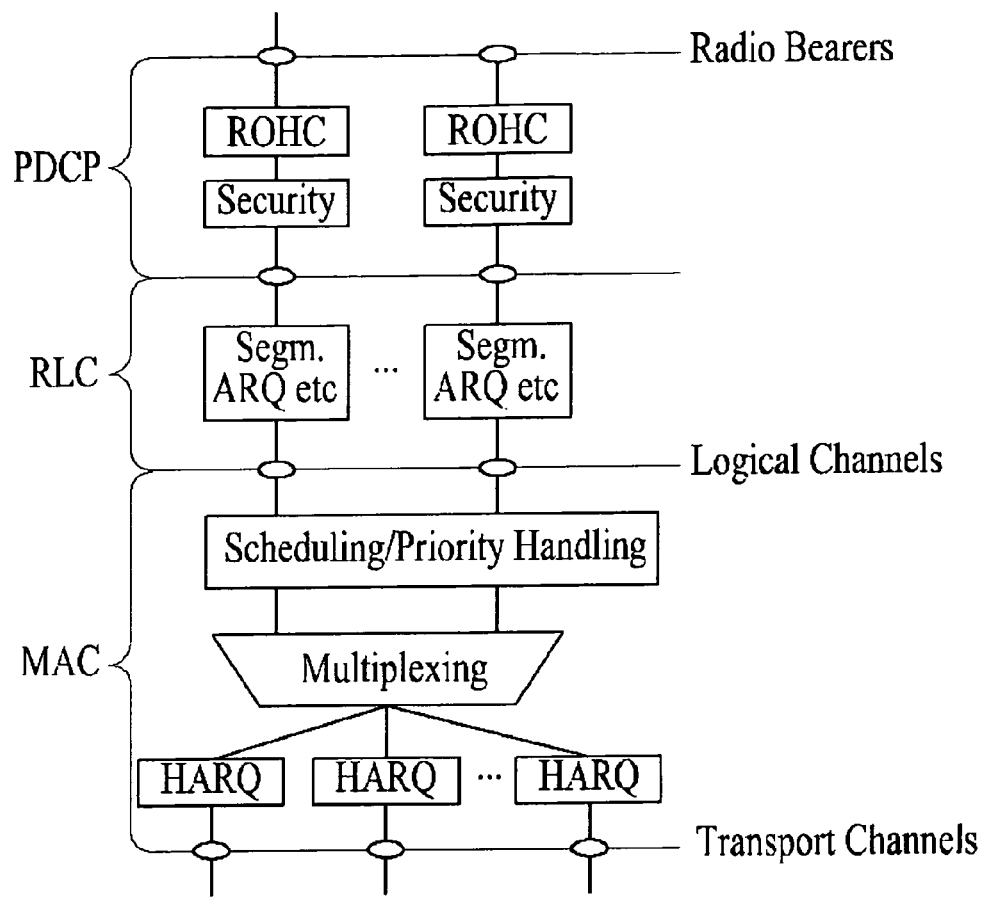
FIG. 13 shows another example of a two-layered structure that considers a carrier aggregation (CA).

FIG. 12 shows an example of a two-layered structure that considers a carrier aggregation (CA). FIG. 13 shows another example of a two-layered structure that considers a carrier aggregation (CA).

The carrier aggregation (CA) technology greatly affects the MAC layer of the second layer. For example, since the CA uses a plurality of CCs and one Hybrid Automatic Retransmit Request (HARQ) entity manages only one CC, the MAC layer of the LTE-A system has to perform the operation related to a plurality of HARQ entities. In addition, each HARQ entity independently processes the transport block. Accordingly, if the carrier aggregation is applied, a plurality of transport blocks can be simultaneously transmitted and received through a plurality of component carriers (CCs).

A method for transmitting and receiving configuration information of a plurality of cells in a wireless communication system based on a carrier aggregation (CA) of the first embodiment of the present invention will hereinafter be described with reference to FIG. 14.

Figure 14:
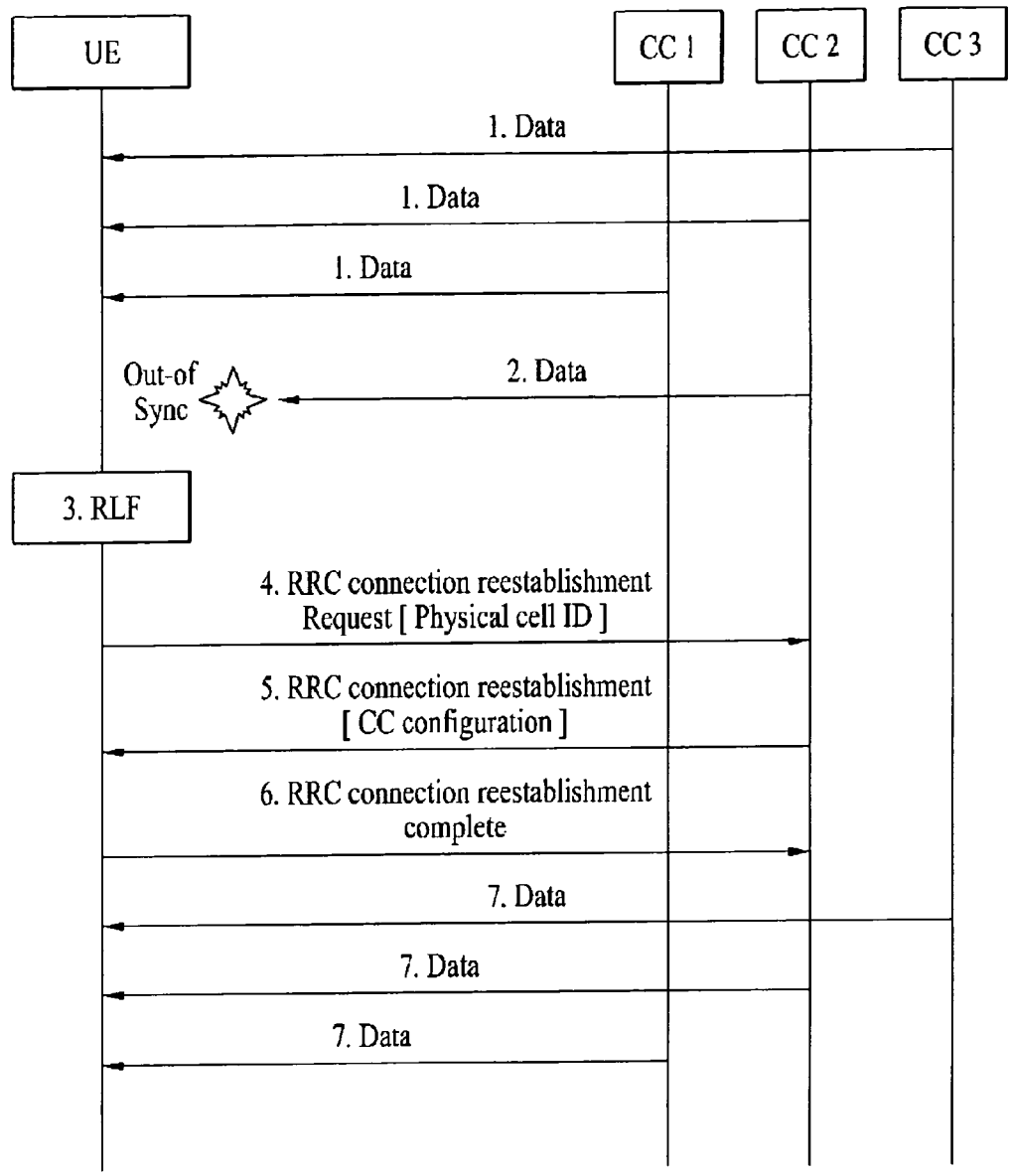
FIG. 14 is a conceptual diagram illustrating a method for transmitting and receiving configuration information of a plurality of cells according to a first embodiment of the present invention.

FIG. 14 is a conceptual diagram illustrating a method for transmitting and receiving configuration information of a plurality of cells according to a first embodiment of the present invention.

Referring to FIG. 14, the BS and the UE transmit and receive data through a plurality of cells. In this case, a specific cell that is used for data transmission/reception between the UE and the BS prior to the occurrence of radio link failure (RLF), is referred to as a source cell.

The UE detects an out-of-synchronization from one of several source cells while communicating with the BS through a plurality of source cells. If the UE detects the out-of-synchronization within a single source cell for a predetermined period of time, the UE declares the radio link failure (RLF).

After the UE has declared the RLF, the UE selects a target cell and transmits a radio link recovery request message to the selected target cell. In this case, the radio link recovery request message may be an RRC connection reestablishment request message. In this case, the radio link recovery request message is an uplink message and includes a UE identifier.

In addition, the radio link recovery request message may include an identifier of a special cell or a primary cell from among a plurality of source cells. In this case, the term 'special cell' is identical to the term 'primary cell'. The BS configures only one primary cell for one UE. The special cell provides at least one of security information and Non-Accesss-Stratum (NAS) mobility information to the UE. The NAS mobility information includes an absolute radio frequency channel number (ARFUN), a physical cell identifier (PCI), an E-UTRAN cell global identifier (ECGI).

In addition, the radio link recovery request message may include a cell having high priority from among the plurality of source cells. In this case, the UE has to recognize priority information of each of the plurality of source cells. The cell priority may be indicative of priority of a carrier frequency of a cell.

It is determined whether the target cell having received the radio link recovery request message is a prepared cell of the UE that has transmitted the radio link recovery request message on the basis of a UE identifier contained in the radio link recovery request message.

If the target cell is the UE's prepared cell, it transmits the radio link recovery response message to the UE. In this case, the radio link recovery response message may be an RRC connection reconfiguration message. The radio link recovery response message may include configuration information of a plurality of target cells. In this case, the plurality of target cells may be an aggregate of carriers.

In addition, the radio link recovery response message may include system information of the plurality of target cells. In addition, the radio link recovery response message may include a measurement configuration for the UE.

If the UE has successfully received the radio link recovery response message, the UE transmits the radio link recovery completion message. In this case, the radio link recovery completion message may be an RRC connection reestablishment completion message. In addition, the RRC connection reestablishment completion message may include the measurement result (or report) of the plurality of target cells.

The UE configures a plurality of target cells according to information of several target cells contained in the received radio link recovery response message. In addition, the UE transmits and receives data to and from the plurality of target cells.

A method for transmitting and receiving configuration information of several cells in a wireless communication system based on a carrier aggregation (CA) of the second embodiment of the present invention will hereinafter be described with reference to FIG. 15.

Figure 15:
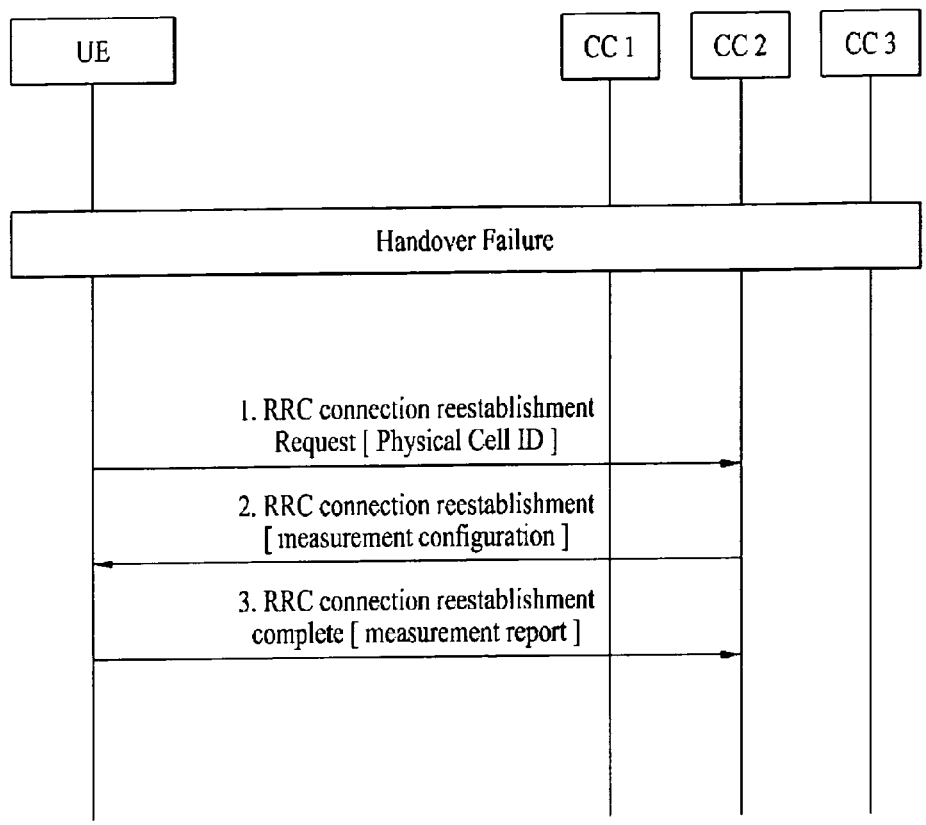
FIG. 15 is a conceptual diagram illustrating a method for transmitting and receiving configuration information of a plurality of cells according to a second embodiment of the present invention.

FIG. 15 is a conceptual diagram illustrating a method for transmitting and receiving configuration information of a plurality of cells according to a second embodiment of the present invention.

The UE that transmits and receives data to and from the plurality of source cells can receive a handover (HO) command from one source cell, such that it can perform HO. If the UE receives the handover (HO) command and a handover (HO) failure occurs in a handover (HO) procedure, the UE can be recovered through the RRC connection reestablishment procedure.

If the HO failure occurs in the HO procedure, the UE selects a target cell and transmits the RRC connection reestablishment request message to the selected target cell. In this case, the RRC connection reestablishment request message includes an identifier (ID) of a source cell having transmitted the HO command message.

After the target cell receives the RRC connection reestablishment request message, it is determined whether the target cell is a UE's prepared cell on the basis of the UE ID. If the target cell is a prepared cell, the target cell transmits the RRC connection reestablishment message to the UE.

The RRC connection reestablishment message may include configuration information of several target cells. In this case, the plurality of target cells may be an aggregation of carriers. In addition, the RRC connection reestablishment message may include system information of the plurality of target cells. The RRC connection reestablishment message may include a measurement configuration for the UE.

If the UE has successfully received the RRC connection reestablishment message, the UE transmits the RRC connection reestablishment completion message. In this case, the RRC connection reestablishment completion message may include the measurement result of several target cells.

The UE configures a plurality of target cells according to configuration information of several target cells contained in the received RRC connection reestablishment message. In addition, the UE transmits and receives data through the plurality of target cells.

In addition, if the RRC connection reestablishment message includes system information about a plurality of target cells, the UE stores the system information. If the measurement configuration for the UE is contained in the RRC connection reestablishment message, the UE performs measurement according to the measurement configuration information.

Figure 16:
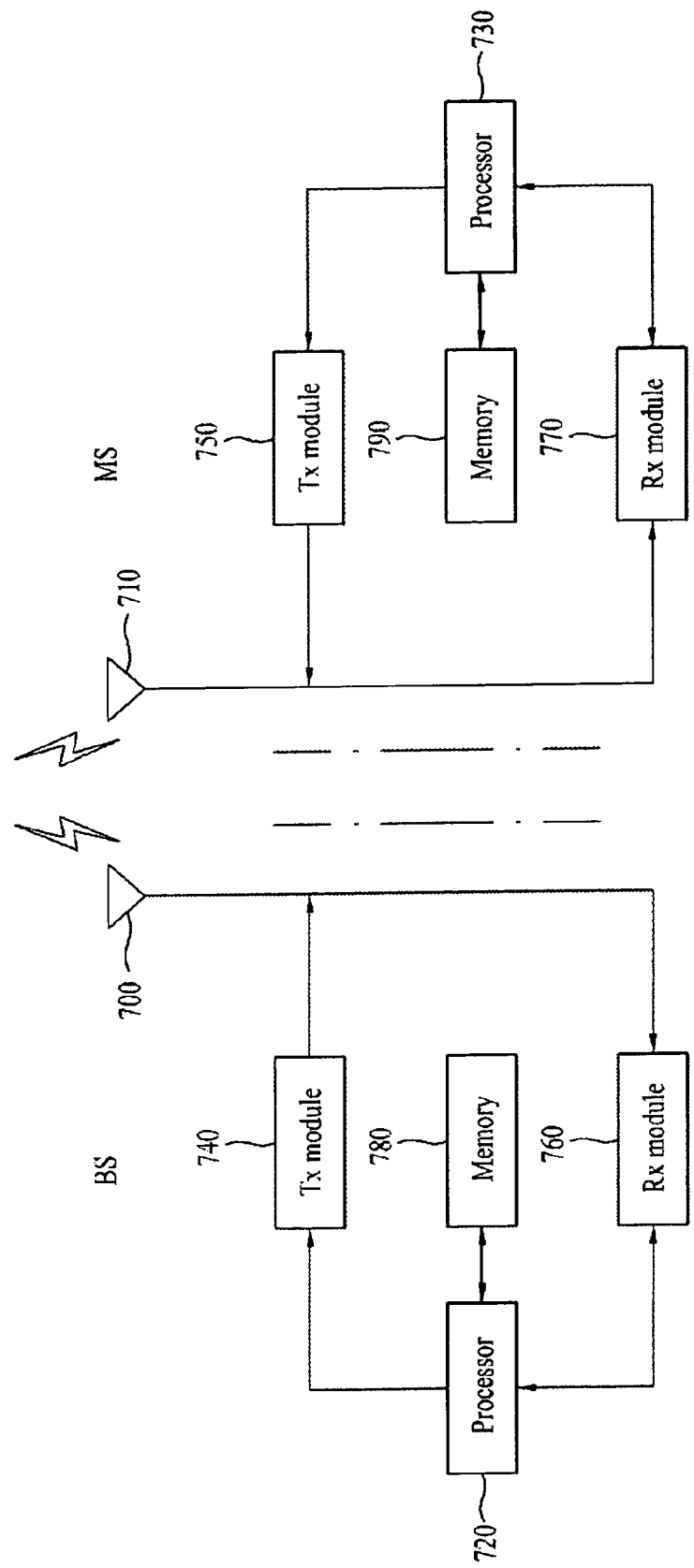
FIG. 16 is a block diagram illustrating a mobile station (MS) and a base station (BS) for use in embodiments of the present invention.

FIG. 16 is a block diagram illustrating detailed constituent components of a mobile station (MS) and a base station (BS) that can be implemented through the above-mentioned embodiments.

Referring to FIG. 16, each of the MS and the BS may include an antenna 700 or 710 for transmitting and receiving information, data, signals and/or messages, a Transmission (Tx) module 740 or 750 for transmitting messages by controlling the antenna 700 or 710, a Reception (Rx) module 760 or 770 for receiving messages by controlling the antenna 700 or 710, a memory 780 or 790 for storing information related to BS communication, and a processor 720 or 730 for controlling the memory 780 or 790.

The antennas 700 and 710 include Tx antennas for transmitting signals generated from Tx modules 740 and 750 and Rx antennas for receiving radio frequency (RF) signals and providing the received RF signals to the Rx modules 760 and 770. If a Multiple Input Multiple Output (MIMO) function is supported, two or more antennas may be provided.

The processors 720 and 730 generally provide overall control to the MS and the BS, respectively. Especially, the processors 720 and 730 may perform a control function for implementing the above-described exemplary embodiments of the present invention, a variable MAC frame control function based on service characteristics and a propagation environment, a handover function, an authentication and encryption function, etc. In addition, each of the processors 720 and 730 may include an encryption module for controlling encryption of various messages and a timer module for controlling transmission and reception of various messages.

The transmission (Tx) modules 740 and 750 may encode and modulate transmission data scheduled by the processors 720 and 730 according to a predetermined coding and modulation scheme and provide the modulated data to the antennas 700 and 710.

The reception (Rx) modules 760 and 770 may recover original data by demodulating and decoding data received through the antennas 700 and 710 and provide the recovered data to the processors 720 and 730.

The memories 780 and 790 may store programs for processing and control of the processors 720 and 730 and temporarily store input/output data (on the side of the MS, an uplink grant received from the BS, system information, a station identifier (STID), a flow identifier (FID), an action time, and the like).

Each of the memories 780 and 790 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other.

Accordingly, the invention should not be limited to the specific embodiments described herein, but should be accorded the broadest scope consistent with the principles and novel features disclosed herein.

Mode for the Invention

Various embodiments have been described in the best mode for carrying out the invention.

INDUSTRIAL APPLICABILITY

The exemplary embodiments of the present invention are applicable to various wireless access systems.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided based upon a rational analysis of the claims, and all modifications within the equivalent range of the present invention are within the scope of the present invention.

The invention claimed is:

1. A method for receiving configuration information of a plurality of cells by a terminal in a wireless communication system, the method comprising:
    detecting a radio connection failure;
    transmitting a radio connection reestablishment request message to a network through a specific cell among a first plurality of aggregated cells;
    receiving a radio connection reestablishment message including configuration information of a second plurality of aggregated cells from the network through the specific cell; and
    configuring the second plurality of aggregated cells by adding at least one cell to the specific cell of the first plurality of aggregated cells based on the configuration information.

2. The method according to claim 1, wherein:
    the radio connection reestablishment request message is a Radio Resource Control (RRC) connection reestablishment request message; and
    the radio connection reestablishment message is an RRC connection reestablishment message.

3. The method according to claim 2, wherein the RRC connection reestablishment request message includes an identifier (ID) of a primary cell among the first plurality of aggregated cells.

4. The method according to claim 3, wherein the primary cell provides at least one of security information and Non-Access-Stratum (NAS) mobility information to the terminal.

5. The method according to claim 2, wherein the RRC connection reestablishment message further includes system information of the second plurality of aggregated cells.

6. The method according to claim 2, wherein the RRC connection reestablishment message further includes measurement information of the second plurality of aggregated cells.

7. The method according to claim 6, further comprising:
    transmitting an RRC connection reestablishment completion message through the specific cell.

8. The method according to claim 7, wherein the connection reestablishment completion message includes a measurement report for the second plurality of aggregated cells.

9. The method according to claim 1, further comprising:
    communicating with the network through at least one of the second plurality of aggregated cells based on the configuration information of the second plurality of aggregated cells.

10. The method according to claim 1, wherein the radio connection failure is at least one of a radio link failure (RLF) or a handover (HO) failure.

11. A method for transmitting configuration information of a plurality of cells by a base station (BS) in a wireless communication system, the method comprising:
    receiving a radio connection reestablishment request message through a specific cell among a first plurality of aggregated cells from a terminal having detected a radio connection failure;
    transmitting a radio connection reestablishment message including configuration information of a second plurality of aggregated cells through the specific cell among the first plurality of aggregated cells to the terminal; and communicating with the terminal through the at least one of the second plurality of aggregated cells, wherein the second plurality of aggregated cells are configured by adding at least one cell to the specific cell of the first plurality of aggregated cells based on the configuration information.

12. The method according to claim 11, wherein:

the radio connection reestablishment request message is a Radio Resource Control (RRC) connection reestablishment request message; and the radio connection reestablishment message is an RRC connection reestablishment message.

13. The method according to claim 12, wherein the RRC connection reestablishment request message includes an identifier (ID) of a primary cell among the first plurality of aggregated cells.

14. The method according to claim 13, wherein the primary cell provides at least one of security information and Non-Access-Stratum (NAS) mobility information to the terminal.

15. The method according to claim 12, wherein the RRC connection reestablishment message further includes system information of the second plurality of aggregated cells.

16. The method according to claim 12, wherein the RRC connection reestablishment message further includes measurement information for the second plurality of aggregated cells.

17. The method according to claim 16, further comprising:

receiving an RRC connection reestablishment completion message from the terminal.

18. The method according to claim 17, wherein the RRC connection reestablishment completion message includes a measurement report for the second plurality of aggregated cells.

19. The method according to claim 11, wherein the radio connection failure is at least one of a radio link failure (RLF) or a handover (HO) failure.

20. The method according to claim 2, wherein the RRC connection reestablishment request message includes identifier (ID) of a cell having high priority of a carrier frequency among the first plurality of aggregated cells.

* * * * *